United States Patent [19]

Anderson et al.

[11] 4,060,961
[45] Dec. 6, 1977

[54] CROP HARVESTING ROTOR

[75] Inventors: John Dale Anderson, Canton; Richard James Buller; Allen Thomas Trego, both of Newton, all of Kans.

[73] Assignee: Hesston Corporation, Hesston, Kans.

[21] Appl. No.: 660,613

[22] Filed: Feb. 23, 1976

[51] Int. Cl.² ............................................. A01D 55/20
[52] U.S. Cl. ........................................ 56/294; 56/364; 241/194
[58] Field of Search ................ 56/12.7, 503, 504, 364, 56/6, 13.6, 344, 294, 295; 241/238, 194

[56] References Cited

U.S. PATENT DOCUMENTS

| 2,986,186 | 5/1961 | White | 241/194 X |
| 3,422,612 | 1/1969 | Panek et al. | 56/294 C |

FOREIGN PATENT DOCUMENTS

| 270,377 | 8/1970 | U.S.S.R. | 56/12.7 |

*Primary Examiner*—Jay N. Eskovitz

*Attorney, Agent, or Firm*—Schmidt, Johnson, Hovey & Williams

[57] ABSTRACT

A rotor for crop handling machines has a plurality of double-pivoted, radially-extending arms and structure on the segments of each arm to position the segments such that any radially inwardly directed impact force, such as from stones and other obstructions, causes immediate buckling of the arm about its pivot points instead of fracturing the segments or bending their mounting pins. In one embodiment, each arm is provided with a positive stop between the segments that holds them in a pre-buckled condition such that the tip of the outer segment, with respect to the direction of rotation of the rotor, trails the common plane containing the pivotal axes of the double-pivoted arm. In a second embodiment the individual segments are constructed such that their centers of gravity are laterally offset, with respect to one another, causing the desired trailing relationship of the tip of the outer segment.

9 Claims, 4 Drawing Figures

CROP HARVESTING ROTOR

This invention relates to material-handling rotors and specifically concerns a rotor having double-pivoted, radial arms particularly arranged to readily buckle in response to radially directed impact forces.

It is known in the rotor art to pivotally secure radiating arms to a supporting hub for the purpose of permitting the arms to swing back opposite to the direction of rotation when encountering large tangential forces such as might be imparted by impact with a rock or other foreign object. While such pivoted-arm rotors are in this way adequately protected from damage by tangential forces, they are still susceptible to serious damage from radially inwardly directed forces. Since an inwardly radial force on the outermost end of the arm is manifestly directed along the longitudinal axis of the arm toward the pivotal axis, such a force does not create a desired moment about the pivotal axis and, accordingly, the arm does not swing back but rather absorbs the force, transmitting the latter through the rotor structure often causing damage to the arm or the remaining portions of the rotor. In situations as described above, wherein the force is directly transmitted without creating a swinging moment, the pivotal axis is typically referred to as being "frozen".

Simply holding the arms back so that their tips slightly trail a line between the axis of rotation of the rotor and the pivot of the arm is not enough to correct the problem, because in many circumstances the applied force is not truly radial but instead is directed, at least in large measure, toward the pivot instead of to one side thereof. The result is a frozen pivot just as before so that the arm breaks or the rest of the rotor is damaged, or both. See, for example, Collins U.S. Pat. No. 2,835,298 or Cunningham, Jr., et al, U.S. Pat. No. 2,753,674.

Double-pivot arms where the tip of the arm is held in leading relationship to a line between the two pivots (such as in White U.S. Pat. No. 2,986,186) do not solve the problem either, because while the arms can buckle readily when the rotor is stationary, it is practically impossible when the rotor is spinning at high speeds. When stationary, the tip can quite easily swing upwardly and forwardly under the application of a radial force, but when spinning, the tremendous angular momentum of each arm applies so much downward and rearward force against the tip that it simply cannot move upwardly and forwardly as it must if the arm is to buckle under radial loading. Hence, the loading is not accommodated and the rotor becomes damaged.

Accordingly, it is one important object of the present invention to provide a pivoted arm rotor which not only accommodates tangential impact loads without damage, but radial impact loads as well.

In accordance with the above object, it is another important object of our invention to provide a rotor having a plurality of double-pivoted, outwardly-extending arms each having structure for offsetting the outermost end of the arm with respect to the direction of rotor rotation in a direction trailing the common plane extending through the two pivotal axes.

It is a further important object of the instant invention to provide such a rotor with stop means limiting the swinging movement between the arm segments to maintain the outermost end of the arm in the desired trailing position.

It is yet another important object of the present invention to provide a rotor with double-pivoted, segmented arms having their centers of gravity so disposed that the outer segment inherently hangs with its tip trailing the common plane passing through the two pivotal axes.

Figure 1:
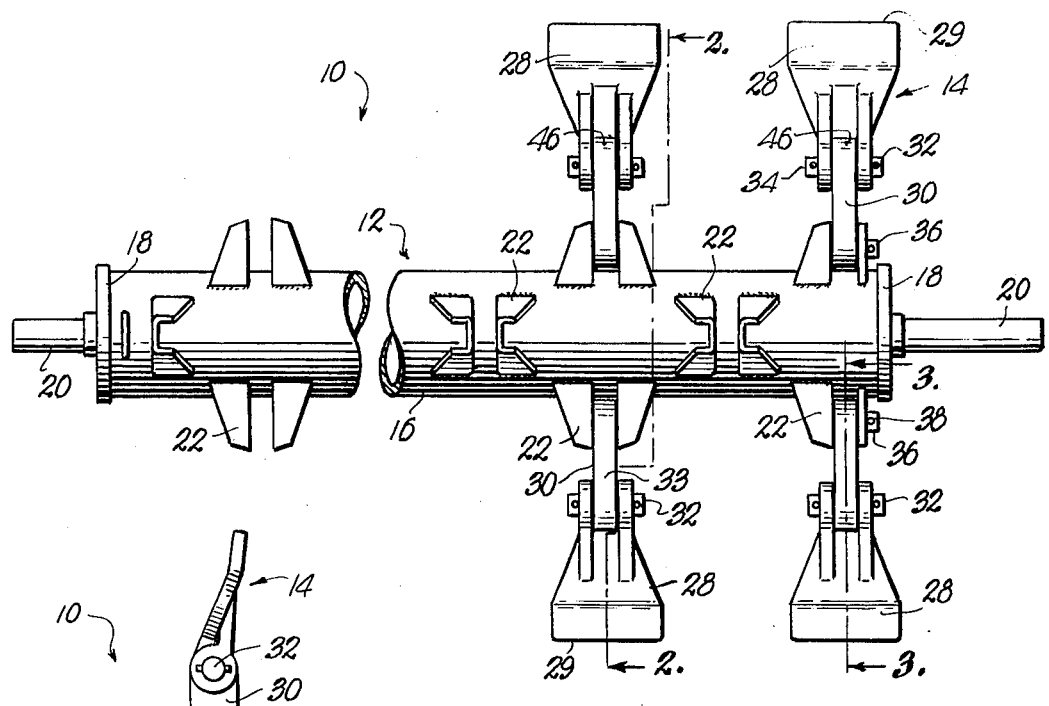
FIG. 1 is a partial, front elevational view of a rotor constructed in accordance with the present invention having some of the arms thereof removed for clarity.

In FIG. 1, a first embodiment of the present invention is shown comprising a rotor 10 having a central elongate hub 12 and a plurality of segmented, radially extending arms 14 carried by the hub 12. Rotor 10 is intended for operation only in one direction of rotation, which direction is counterclockwise when viewing FIG. 2 and is designated by an arrow 26. It is to be understood that for clarity the radiating arms 14 are shown in their outermost position which they would normally assume while under the influence of a centrifugal force caused by rotation of rotor 10.

Hub 12 comprises an elongate cylindrical tube 16 enclosed at opposite ends by a pair of circular end caps 18. Each cap 18 has an outwardly extending, axially aligned shaft section 20 which is journaled by appropriate rotor support structure (not shown) on an agricultural vehicle or the like. Of course, shaft sections 20 are also adapted for connection with a power transmitting drive (not shown) for effecting powered rotation of rotor 10 about the longitudinal axis of hub 12.

Figure 2:
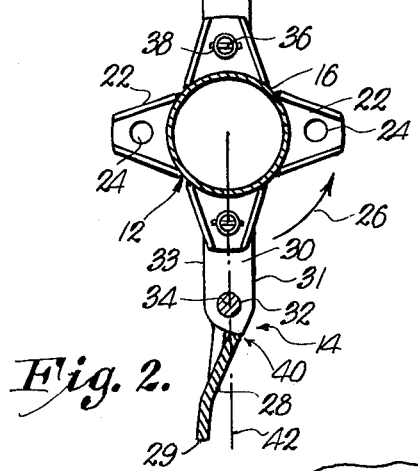
FIG. 2 is a cross-sectional view of the rotor, taken along line 2—2 of FIG. 1.

The outer cylindrical surface of tube 16 has a plurality of outwardly extending, triangular mounts 22 arranged in opposed pairs along the length of tube 16. In the preferred embodiment, the pairs are arranged in staggered, diametrically opposed sets as shown in FIGS. 1 and 2 to effect dynamic balancing and smoothness of operation. Each mount 22 is provided with a through hole 24 adjacent its apex having an axis extending parallel to the axis of hub 12 and in axial registration with the hole 24 of its most adjacent mount 22.

Each arm 14 is segmented and includes an outer element in the form of a triangular paddle 28 having an outermost edge 29, an elongate inner link 30, and a first pivot pin 32 pivotally interconnecting paddle 28 and link 30 for relative swinging movement about an outer axis 34. Link 30 has a leading edge 31 and a trailing edge 33 with respect to the direction of rotation. Each arm 14 is pivotally secured to a pair of triangular mounts 22 by a second pivot pin 36 extending through aligned holes 24 and a corresponding hole in inner link 30 to permit swinging movement of the latter about an inner axis 38 which is spaced inwardly from axis 34 and extends parallel to the axis of hub 12.

Each arm 14 is provided with positioning means to orient link 30 and paddle 28 such that the outermost end 29 is spaced in a trailing direction from the common plane passing through axes 34 and 38. This relationship can best be seen in FIGS. 2 and 3 wherein the outermost end 29 trails the common plane represented by lines 42 with respect to the counterclockwise rotation of rotor 10.

Figure 3:
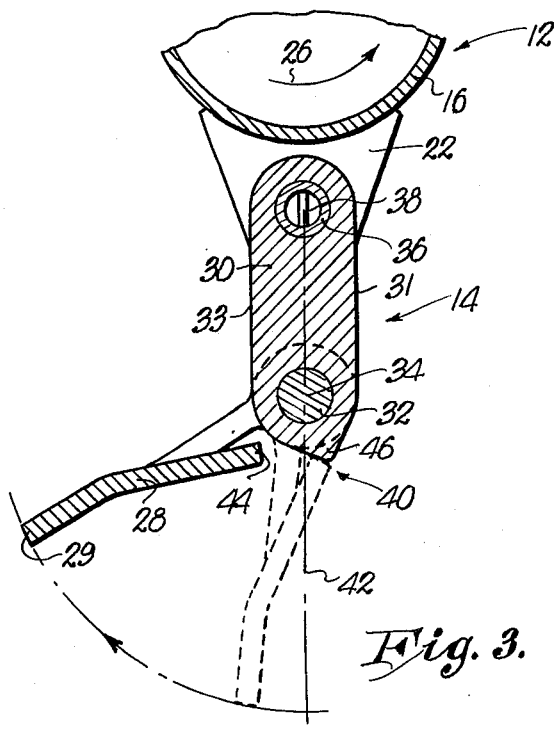
FIG. 3 is an enlarged, partial cross-sectional view taken along line 3—3 of FIG. 1 with the arm buckled.

In the first embodiment of the present invention, the positioning means is in the form of a positive stop 40 comprising a shoulder 44 on paddle 28 opposite the end 29 and a protuberance 46 on the end of link 30 adjacent paddle 28. Shoulder 44 is adapted to engage protuberance 46 to limit forward swinging of paddle 28 relative to link 30 in a direction corresponding to the direction of rotation. As shown in FIG. 3, when paddle 28 reaches the position indicated in broken lines wherein shoulder 44 is in engagement with protuberance 46, continued counterclockwise swinging of paddle 28 relative to link 30, is prevented.

Figure 4:
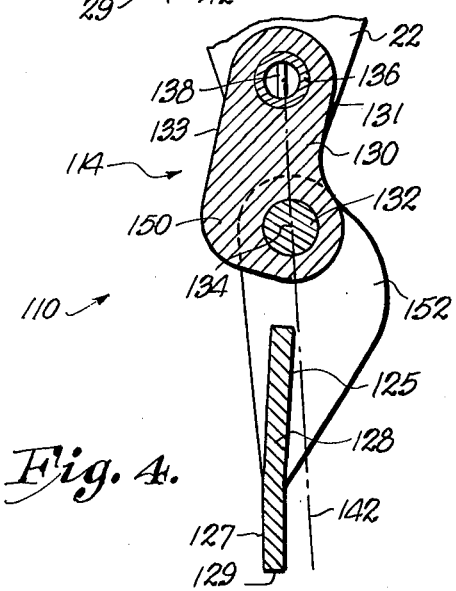
FIG. 4 is a view similar to FIG. 3 showing a second embodiment of the present invention.

A second embodiment of the present invention is distinguished from the first embodiment only by changes in structure of the radiating arms, the remaining components being exactly the same as those of the first embodiment. In FIG. 4, the arm 114 of rotor 110 has an inner link 130 pivotally connected to an outer paddle 128 by a first pivot pin 132 for swinging movement about an outer axis 134. Though not shown, it is of course understood that rotor 110 has a plurality of arms 114 arranged along a hub in the same manner as rotor 10 of the first embodiment. The direction of rotation of rotor 110 is counterclockwise when viewing FIG. 4.

With respect to the direction of rotation, link 130 has a leading edge 131 and a trailing edge 133; similarly, paddle 128 has a leading face 125 and a trailing face 127. Arm 114 is secured to mounts 22 on hub 12 by a second pivot pin 136 which extends through the inner end of link 130 for swinging movement of link 130 about an inner axis 138 extending parallel to axis 134 and the axis of hub 12. As in the first embodiment, the parallel arrangement between axes 134 and 138 permits a single plane to pass through these axes, one such plane being designated by the broken line 142 in FIG. 4.

Link 130 includes rearwardly disposed enlargement structure 150 for offsetting the center of mass of the link 130 from the longitudinal axis of the latter in a direction toward the trailing edge 133. Similarly, paddle 128 contains forwardly disposed enlargement structure 152 for offsetting its center of mass from the longitudinal axis of the latter in a direction away from the trailing face 127. The tendency, therefore, is for link 130 to swing counterclockwise until its center of mass is directly below axis 138. This pushes outer pivot 132 forwardly, making the tip end 129 hang slightly behind line 142. Further, the tendency is for paddle 128 to swing clockwise until its center of mass is directly below axis 134. This places tip end 129 even further behind the line 142.

In the operation of the first embodiment, rotor 10 is typically carried in proximity to the ground by an agricultural vehicle such as, in the crop pickup unit of a stack-forming machine. The momentum of the paddles 28 as they rotate with hub 12 is great enough to overcome normal tangential forces which might be imparted to the paddles 28 during lifting and projecting ground-lying hay; however, should a high tangential force be encountered by impact with a foreign object such as a loose stone, paddles 28 are free to yield rearwardly by swinging about axis 34 or 38, thus avoiding damage from impact with the foreign object. Moreover, should a radially directed force be encountered by outer tips 29 passing over the top of a ground-lying rock or the like, arms 14 will immediately buckle as pivots 34 are pushed forwardly in response to the upward and rearward movement of paddle tips 29. Therefore, the arms 14 pass harmlessly over the potentially destructive obstacle.

It is important to note here that the unique arrangement of providing a double-pivoted, *trailing* offset arm permits the arm to readily buckle regardless of whether the radially directed force is precisely radial. Moreover, by this relationship the rotation of hub 12 and arm 14 *augments* rather than *counters* the buckling action between paddle 28 and link 30, so that such action is immediate and substantial.

The second embodiment functions similar to the first embodiment with respect to immediate buckling, the only difference being the manner in which the trailing relationship of outer edge 129 is achieved. However, because the tremendous centrifugal forces involved during high speed rotation tend to straighten the arms 114 from their "pre-buckled" conditions as illustrated in FIG. 4, in some situations it may be preferable to employ the design of the first embodiment with its positive stop advantage.

Having thus described the invention, what is claimed as new and desired to be secured by Letters Patent is:

1. A rotor for harvesting crop material and the like, said rotor including:
   a hub rotatable in one direction about a first axis;
   a link pivotally mounted on said hub for swinging movement about a second axis extending generally parallel to said first axis;
   an element pivotally secured to said link for swinging movement about a third axis spaced from said second axis in substantially parallel relationship to the latter,
   said element having an outermost end,
   said second and third axes being disposed in a common plane; and
   means for gravitationally positioning said outermost end such that the latter is normally spaced in trailing relationship to said common plane with respect to said direction of rotation for permitting said link and element to buckle readily in response to a radially inwardly directed force on said outermost end.

2. A rotor as claimed in claim 1, wherein said outermost end is inturned toward said common plane.

3. A rotor as claimed in claim 1, wherein said link has a leading and a trailing edge with respect to said direction of rotation, said positioning means including structure on said link so located as to gravitationally offset the center of gravity of the link from said common plane in a direction toward said trailing edge.

4. A rotor as claimed in claim 3, wherein said element has a leading and a trailing face with respect to said direction of rotation, said positioning means including structure so located as to gravitationally offset the center of gravity of said element from the longitudinal axis of the latter in a direction forwardly from said trailing face.

5. A rotor as claimed in claim 4, wherein said rotor includes a plurality of said links arranged along said hub and a plurality of said elements each pivotally secured to a respective link.

6. A rotor as claimed in claim 1, wherein said element has a leading and a trailing face with respect to said direction of rotation, said positioning means including structure on said element so located as to gravitationally offset the center of gravity of the element from the longitudinal axis of the latter in a direction forwardly from said trailing face.

7. A rotor for harvesting crop material and the like, said rotor including:
   a hub rotatable in one direction about a first axis;

a link pivotally mounted on said hub for swinging movement about a second axis extending generally parallel to said first axis;

an element pivotally secured to said link for swinging movement about a third axis spaced from said second axis in substantially parallel relationship to the latter, said element having an outermost end, said second and third axes being disposed in a common plane; and means for positioning said outermost end such that the latter is normally spaced in trailing relationship to said common plane with respect to said direction of rotation for permitting said link and element to buckle readily in response to a radially inwardly directed force on said outermost end, said positioning means comprising stop means for limiting the swinging movement between said link and said element, said link having a generally arcuate periphery adjacent said third axis, said stop means including a protuberance on said periphery, and a shoulder on said element adjacent said periphery for engaging said protuberance to prevent swinging of said outermost end into said common plane.

8. A rotor as claimed in claim 7, wherein said link has a leading edge and a trailing edge with respect to said direction of rotation, said protuberance being disposed adjacent said leading edge.

9. A rotor as claimed in claim 8, wherein said rotor includes a plurality of said links arranged along said hub and a plurality of said elements each pivotally secured to a respective link.

* * * * *